United States Patent [19]

Tokuda et al.

[11] 4,264,195
[45] Apr. 28, 1981

[54] EXPOSURE CONTROL DEVICE FOR COLOR PRINTER

[75] Inventors: Kanji Tokuda; Sumio Yoshikawa, both of Minami-ashigara, Japan

[73] Assignee: Fujii Photo Film Co., Ltd., Minami-ashigara, Japan

[21] Appl. No.: 46,613

[22] Filed: Jun. 8, 1979

[30] Foreign Application Priority Data

Aug. 25, 1977 [JP] Japan ................................ 52-101847

[51] Int. Cl.³ ............................................ G03B 27/73
[52] U.S. Cl. ...................................... 355/38; 355/68; 355/71
[58] Field of Search .................................. 355/35–38, 355/67–71, 83, 88

[56] References Cited

U.S. PATENT DOCUMENTS

| | | | |
|---|---|---|---|
| 3,130,634 | 4/1964 | Kropp et al. | 355/71 X |
| 3,205,767 | 9/1965 | Weber et al. | 355/71 X |
| 4,056,319 | 11/1977 | Mischo | 355/71 X |

Primary Examiner—L. T. Hix
Assistant Examiner—W. J. Brady

[57] ABSTRACT

In a color printer provided with an optical path into which a negative is brought and an image of the negative is focused on a photographic paper to make a color print, an exposure control device is provided. The exposure control device has a plurality of neutral density filters which can be put into the optical path of the color printer independently of or in combination with each other. The combination of the plurality of neutral density filters is selected to stepwisely change the total density of the combined neutral density filters according to the density of the negative brought into the optical path of the color printer. The plurality of neutral density filters are gray filters and have different densities.

4 Claims, 4 Drawing Figures

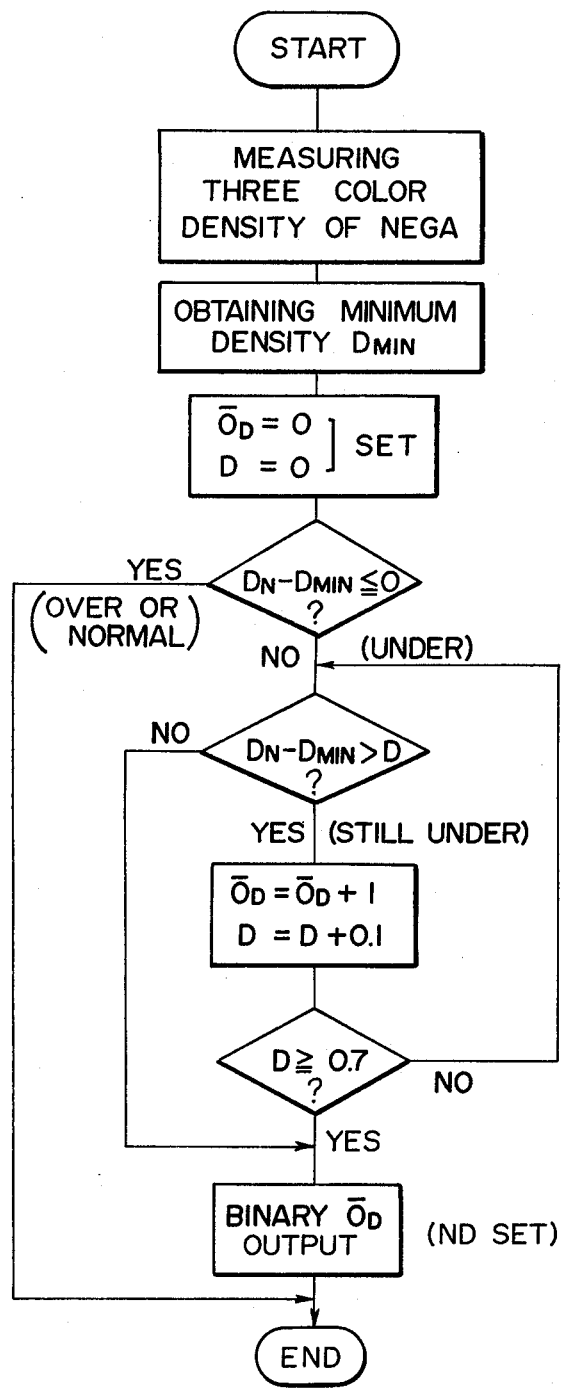

EXPOSURE CONTROL DEVICE FOR COLOR PRINTER

BACKGROUND OF THE INVENTION

1. Field of the Invention

This invention relates to an exposure control device for a color printer, and more particularly to an exposure control device for stepwisely controlling the amount of light used for exposing photographic paper in a color photographic printer.

2. Description of the Prior Art

In a color photographic printer, the intensity of light source cannot be changed because the color balance of the light source spectrum must be maintained constant. Therefore, the intensity of the light source is made constant and the exposure time for the three primary colors, cyan (C), magenta (M) and yellow (Y), is controlled by use of filter shutters of the three colors.

In the color printer, the exposure time is set to be 200 msec for standard color negatives, 800 msec for two step over-exposure negatives, and 70 msec for two or three step under-exposure negatives, for instance. Recently, the speed of the printer is increased and it is desired that the exposure time be shortened to a half of the conventional time exposure. In such a case, the exposure time is required to be as short as 30 msec for the under-exposure negatives. The 30 msec is too short for the electrical and mechanical shutter control means to conduct the normal operation of the filter shutters in the conventional printers. This results in malfunction of the exposure control means, and the exposure time cannot correctly be controlled.

In order to avoid the above mentioned difficulty, it is known to elongate the exposure time only when the prints are made from under-exposure negatives. This is carried out by inserting a neutral density filter into the optical path of the printer when an under-exposure negative is brought to the printing station of the printer. The insertion of the neutral density filter is simply controlled by turning ON and OFF a control circuit. Therefore, the amount of light used for exposing the photographic paper is abruptly changed at a predetermined level of density of the negatives. Accordingly, the exposure control or density compensation cannot be conducted continuously, which results in production of color prints of two groups of color balance which are much different from each other. In order to reduce the difference in color balance of these color prints, it is necessary to use a complicated color balance correcting circuit which is practically almost impossible.

SUMMARY OF THE INVENTION

In view of the above discussed problems, the primary object of the present invention is to provide an exposure control device for a color printer which is capable of step-wisely controlling the amount of light used for exposing photographic paper to obtain color prints of continuously corrected color balance.

This object is accomplished by employing a plurality of neutral density filters which can be put into the optical path of the printer independently of or in combination with each other, a selecting means for selecting the combination of the plurality of neutral density filters for stepwisely changing the total density of the combined neutral density filters, and a control means for bringing the neutral density filters into the optical path of the printer only when the density of the negatives is beyond the range of the standard density.

In accordance with the present invention, the amount of light used for exposing the photographic paper can be changed in a great number of steps by use of a comparatively small number of neutral density filters. Therefore, color prints with a desirable color balance can always be obtained whether the color negative is over-exposure or under-exposure.

BRIEF DESCRIPTION OF THE DRAWING

FIG. 4 is a chart representing the operation of a selecting means employed in the exposure control device of this invention.

PREFERRED EMBODIMENTS OF THE INVENTION

Figure 1:
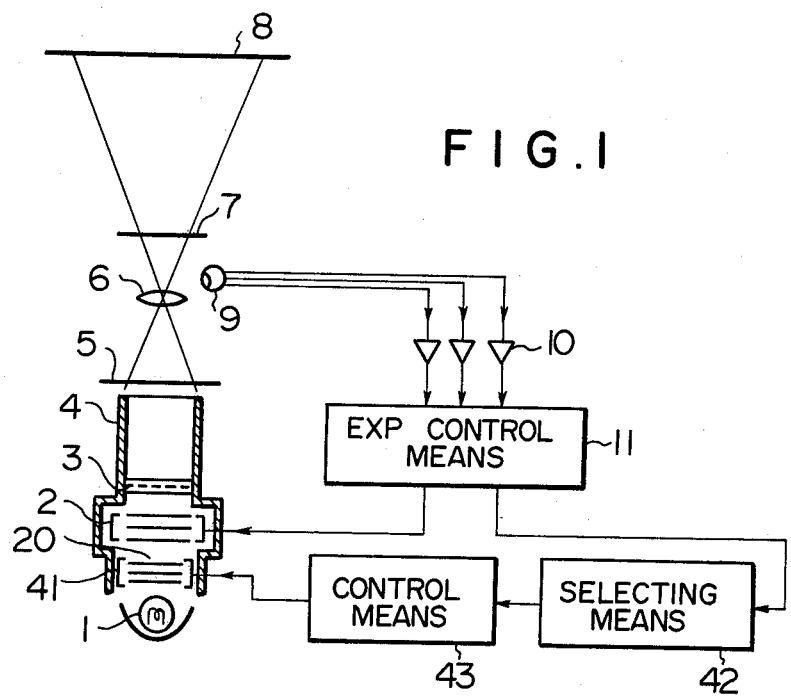
FIG. 1 is a schematic view showing a color printer provided with the exposure control device in accordance with an embodiment of this invention.

FIG. 1 shows the normal structure of a color printer provided with the exposure control device in accordance with an embodiment of the present invention. Referring to FIG. 1, a light source 1 is provided to give exposure to a photographic paper 8 through a filter shutter unit 2 consisting of C, M and Y filters, a color correction filter 3, a mirror box 4, a negative 5, a focusing lens 6, and a black shutter 7. The color correction filter 3 is used for correcting the spectrum of the light emitted by the light source 1. A photoreceptor 9 is provided in the vicinity of the optical path of the printer and photocurrent conversion amplifiers 10 for three colors, red, green and blue are connected with the photoreceptor 9 to amplify the photocurrent representing the three colors. An exposure control means 11 is connected with the amplifiers 10 to control the filter shutter unit 2. The exposure control means 11 is of the well known type which operates based on the so-called Evans' Law. That is, LATD (Large area transmittance density) is measured for every color (R, G, B) of the three primary colors and the exposure time is determined for each color based on the measured LATD from the photocurrent conversion amplifiers 10.

Figure 2:
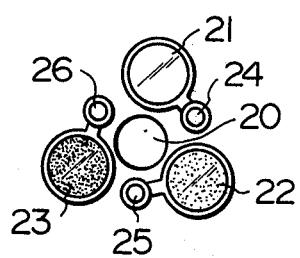
FIG. 2 is a plan view showing an example of a neutral density filter unit which can be used in the exposure control device of this invention.

In accordance with the present invention, a neutral density filter unit 41 is provided in front of the light source 1 in the optical path 20 of the color printer. The neutral density filter unit 41 consists of three neutral density filters 21, 22 and 23 which are driven by respective solenoids 24, 25 and 26 as shown in FIG. 2. The neutral density filters 21, 22 and 23 have different densities and are selectively put into the optical path 20 by the solenoids 24, 25 and 26 in accordance with the output of a control means 43 that is operated by the output of a selecting means 42. The control means 43 is connected with the exposure control means 11 to be controlled thereby. The selecting means 42 receives the output of the amplifiers 10 through the exposure control means 11 and detects the density difference between the negative 5 to be printed and the standard negative. Then, based on the detected difference in density, the selecting means 42 operates to select the combination of the neutral density filters 21, 22 and 23 to be brought into the optical path 20 of the color printer. The control means 43 operates to drive the solenoids 24, 25 and 26 of the neutral density filters 21, 22 and 23 of the neutral density filter unit 41 in accordance with the output of the selecting means 42. The neutral density filters 21, 22 and 23 are normally retracted from the optical path 20 of the printer and are selectively put into the optical path when the control means 43 has determined that the density of the negative 5 is beyond the range of standard negative. In accordance with the degree of difference in density of the negative 5 from the standard negative, the density of the neutral density filters or combination thereof is determined and the proper solenoids 24, 25 and 26 are selectively driven to put the proper neutral density filters 21, 22 and 23 into the optical path 20 of the color printer.

In operation, the light source 1 is first turned on and the filter shutter unit 2 is opened and the black shutter 7 is closed. Then, the exposure is initiated with white light by opening the black shutter 7. The exposure is terminated by closing separately the three color filters C, M and Y and finally closing the black shutter 7. Thereafter, the filter shutter unit 2 is a opened again for the next exposure.

Now, the neutral density filters 21, 22 and 23 will further be described in detail hereinbelow. The neutral density filters has a flat spectral absorption distribution. When the neutral density filters are superposed with each other, the total density of the superposed filters becomes the simple sum of the densities of the respective filters. As the neutral density filter can be used a gray filter having a uniform density or a light atenuating plate having uniformly distributed fine light intercepting portions such as opaque stripes. The fine light intercepting portions can be in the shape of parallel stripes, radially extending opaque lines, concentric lines, lattice, or a combination of some of these shapes.

Figure 3:
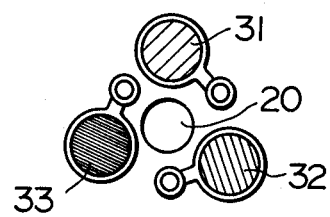
FIG. 3 is a plan view showing another example of a neutral density filter unit which can be used in the exposure control device of this invention.

FIG. 2 shows an example of the neutral density filter unit consisting of three neutral density filters 21, 22 and 23. The transmission densities of the first, second and third filters 21, 22 and 23 are 0.1, 0.2 and 0.4, respectively. FIG. 3 shows an example of the neutral density filter unit consisting of three light atenuating plates 31, 32 and 33 having uniformly distributed fine light intercepting portions as mentioned above having the transmission densities of 0.1, 0.2 and 0.4, respectively. The light atenuating plates 31, 32 and 33 are also referred as "neutral density filters" in other parts of this specification.

By combining the three neutral density filters 21–23 or 31–33, eight steps of total density can be obtained as listed below in Table I. When four kinds of filters having densities consecutively different stepwisely by two times are used, 16 steps can be obtained.

TABLE I

| Step | Filter (density) 21 or 31 (0.1) | 22 or 32 (0.2) | 23 or 33 (0.4) | Total Density |
|---|---|---|---|---|
| 1 | OFF | OFF | OFF | 0 |
| 2 | ON | OFF | OFF | 0.1 |
| 3 | OFF | ON | OFF | 0.2 |
| 4 | ON | ON | OFF | 0.3 |
| 5 | OFF | OFF | ON | 0.4 |
| 6 | ON | OFF | ON | 0.5 |
| 7 | OFF | ON | ON | 0.6 |
| 8 | ON | ON | ON | 0.7 |

In the above described embodiment of the present invention, the selecting means 42 and the control means 43 are constructed as described hereinbelow, for instance.

When a negative of standard density is brought to the printing station, the exposure time is set to be of standard length. When a negative of under-exposure is brought in, the exposure time is controlled to be short without the exposure control device of this invention. This exposure time is elongated by inserting the neutral density filters into the optical path of the color printer in accordance with the control device of this invention. When the output of the photocurrent amplifiers 10 indicates that the negative 5 brought in is of under-exposure, the difference in density between the standard negative and the negative brought in measured by the exposure control means 11 is divided by 0.1 and the quotient is represented by a binary code. When one of the unit digit, the tenth digit and the hundredth digit is "1", one of the neutral density filters 21 or 31, 22 or 32 and 23 or 33 having the transmission densities of 0.1, 0.2 and 0.4, respectively, is inserted into the optical path.

The above-mentioned operation of the selecting means 42 will be described in more detail referring to FIG. 4. The density of the negative 5 is measured for the three colors and the minimum density ($D_{MIN}$) is thus obtained. Then, the ($D_{MIN}$) is compared with the standard density ($D_N$) and it is judged which is larger, namely if $D_N - D_{MIN}$ is positive or negative. If the difference $D_N - D_{MIN}$ is negative or zero ($D_N - D_{MIN} \leq 0$), it is determined that the negative is of normal or over exposure. If the difference is positive ($D_N - D_{MIN} > 0$), it is determined that the negative is of under exposure. In case of the normal or over exposure negative, the insertion of the neutral density filter is unnecessary. In case of the under exposure negative, it is further judged if the difference is larger than the density (D) of the neutral density filter consecutively added in the optical path. When the difference becomes smaller than the density ($D_N - D_{MIN} < D$), it is determined that the neutral density filter of the density (D) is to be put into the optical path for compensation, and accordingly an output signal indicating this is given to the control means 43. When the difference is still larger than the density ($D_N - D_{MIN} > D$), it is determined that the exposure of the negative 5 is still under. Therefore, the density of the combination of the neutral density filter is increased in the order as shown in the Table I. When the density is 0.7 or more ($D \geq 0.7$), the density of 0.7 is selected. The output of the selecting means 42 to the control means 43 is in the form of a binary code which represents a density of 0 to 0.7.

For example, the following steps are carried out by the exposure control device of this invention as described hereinabove.

(1) The standard density is set to be 0.7.
(2) Assume that the density of the negative 5 to 0.2.
(3) The difference between the standard density and the density of the negative 5 is 0.5.
(4) When this is divided by 0.1, the quotient is 5.
(5) This is represented as 101 according to a binary code system.
(6) Since the unit digit is "1", the neutral density filter 21 or 31 of the density 0.1 is inserted.
(7) Since the tenth digit is "0", the neutral density filter 22 or 32 of the density 0.2 is not inserted.
(8) Since the hundredth digit is "1", the neutral density filter 23 or 33 of the density 0.4 is inserted.

(9) As a result, a neutral density filter combination having a density of 0.5 is inserted into the optical path of the color printer and the effective density becomes 0.7, which is equal to the standard density. Accordingly, the exposure time can be elongated to the standard exposure time.

Since the binary code system is usually used by a computer, it is very easy to adapt the exposure control device of this invention to a computer controlled exposure control system of a color printer.

It will readily be understood by those skilled in the art that the neutral density filter unit may always be used so that the printing from a standard negative is conducted with a neutral density filter of a density of, for instance, 0.4 and the printing from an under- or over-exposure negative is conducted with a neutral density filter of higher or lower density.

We claim:

1. In a color printer provided with an optical path into which a negative is brought and an image of the negative is focused on a photographic paper to make a color print, an exposure control device comprising a measuring means for measuring the density of the negative and giving an output representing the density, a plurality of neutral density filters which can be put into the optical path of the color printer independently of or in combination with each other, a selecting means for selecting the combination of the plurality of neutral density filters to be put into the optical path to stepwisely change the total density of the combined neutral density filters according to the output of said measuring means and giving an output representing the density, and a control means for controlling insertion of the neutral density filters into the optical path according to the output of said selecting means.

2. An exposure control device as defined in claim 1 wherein said plurality of neutral density filters have different densities.

3. An exposure control device as defined in claim 1 or 2 wherein said neutral density filters are gray filters.

4. An exposure control device as defined in claim 1 or 2 wherein said neutral density filters are light atenuating plates having uniformly distributed fine light intercepting portions.

* * * * *

UNITED STATES PATENT OFFICE
CERTIFICATE OF CORRECTION

Patent No. 4,264,195     Dated April 28, 1981

Inventor(s) KANJI TOKUDA et al

It is certified that error appears in the above-identified patent and that said Letters Patent are hereby corrected as shown below:

On the title page:
Please change the name of the Assignee from

"FUJII PHOTO FILM CO., LTD." to

--FUJI PHOTO FILM CO., LTD.--

Signed and Sealed this

Thirteenth Day of December 1983

[SEAL]

Attest:

GERALD J. MOSSINGHOFF

Attesting Officer     Commissioner of Patents and Trademarks